US012614559B2

(12) United States Patent
Fuglsig

(10) Patent No.: US 12,614,559 B2
(45) Date of Patent: Apr. 28, 2026

(54) NEAR-END SPEECH INTELLIGIBILITY ENHANCEMENT WITH MINIMAL ARTIFACTS

(71) Applicant: RTX A/S, Nørresundby (DK)

(72) Inventor: Andreas Jonas Fuglsig, Nørresundby (DK)

(73) Assignee: RTX A/S, Nørresundby (DK)

( * ) Notice: Subject to any disclaimer, the term of this patent is extended or adjusted under 35 U.S.C. 154(b) by 162 days.

(21) Appl. No.: 18/494,874

(22) Filed: Oct. 26, 2023

(65) Prior Publication Data

US 2024/0144947 A1 May 2, 2024

(30) Foreign Application Priority Data

Oct. 28, 2022 (EP) .................................... 22204444

(51) Int. Cl.
*G10L 21/02* (2013.01)

(52) U.S. Cl.
CPC .................................... *G10L 21/02* (2013.01)

(58) Field of Classification Search
CPC ...................................................... G10L 21/02
See application file for complete search history.

(56) References Cited

PUBLICATIONS

S. Khademi, R. C. Hendriks and W. B. Kleijn, "Intelligibility Enhancement Based on Mutual Information," in IEEE/ACM Transactions on Audio, Speech, and Language Processing, vol. 25, No. 8, pp. 1694-1708, Aug. 2017 (Year: 2017).*

B. Sauert and P. Vary, "Near end listening enhancement optimized with respect to Speech Intelligibility Index," 2009 17th European Signal Processing Conference, Glasgow, UK, 2009, pp. 1844-1848 (Year: 2009).*

Fuglsig et al.; "Minimum Processing Near-End Listening Enhancement"; IEEE/ACM Transactions on Audio, Speech and Language Processing; vol. 31; 2023; p. 2233-2245.

European Patent Application No. 22204444.8; Extended Search Report; dated Mar. 17, 2023; 11 pages.

(Continued)

*Primary Examiner* — Bhavesh M Mehta
*Assistant Examiner* — Joseph J. Yamamoto
(74) *Attorney, Agent, or Firm* — BakerHostetler

(57) ABSTRACT

A method for enhancement of speech intelligibility in a device arranged for a near-end side a communication with a far-end device. The method involves calculating a measure of speech intelligibility at the near-end side based on a near-end audio input and a far-end audio input. Then, based on the calculated measure of speech intelligibility optimizing parameters of a predetermined speech enhancement algorithm, where a predetermined speech intelligibility target, and an additional target are taken into account to generate an optimized speech enhancement algorithm. Next, processing the far-end audio input according to the optimized speech enhancement algorithm, and generating a near-end audio output accordingly. The algorithm can adapt to changing noise conditions and be optimized for both speech intelligibility and another target. This can be used to minimize delay, electric power consumption and audio quality while satisfying the speech intelligibility target. The optimization can be based on a closed-form solution.

13 Claims, 2 Drawing Sheets

(56) References Cited

PUBLICATIONS

Li et al.; "Multi-Metric Optimization Using Generative Adversarial Networks for Near-End Speech Intelligibility Enhancement"; IEEE/ACM Transactions on Audio, Speech and Language Processing; vol. 29; 2021; p. 3000-3011.
Zahedi et al.; "Minimum Processing Beamforming"; IEEE/ACM Transactions on Audio, Speech and Language Processing; vol. 29; 2021; 14 pages.
Fuglsig et al.; "Joint Far- and Near-End Speech Intelligibility Enhancement Based on the Approximated Speech Intelligibility Index"; IEEE Int'l Conf. on Acoustics, Speech and Signal Processing; 2021; 5 pages.
Niermann et al.; "Listening Enhancement in Noisy Environments: Solutions in Time and Frequency Domain"; IEEE/ACM Transactions on Audio, Speech and Language Processing; vol. 29; 2021; p. 699-709.

* cited by examiner

NEAR-END SPEECH INTELLIGIBILITY ENHANCEMENT WITH MINIMAL ARTIFACTS

RELATED APPLICATIONS

The present application claims priority to and the benefit of European patent application EP22204444.8, "Near-End Speech Intelligibility Enhancement With Minimal Artifacts" (filed Oct. 28, 2022). All foregoing applications are incorporated herein by reference in their entireties for any and all purposes.

FIELD OF THE INVENTION

The present invention relates to the field of wireless audio, such as wireless speech communication, such as wireless two-way speech communication in noisy environments, such as wireless inter-com devices or systems. More specifically, the invention provides a near-end speech intelligibility enhancement for enhancing speech intelligibility in the case of noise at the near-end, i.e. where the listener is present. Especially, the speech enhancement processing is capable of minimizing audible quality degradation while providing an enhanced audibility enhancement, e.g. in terms of a speech intelligibility index measure.

BACKGROUND OF THE INVENTION

Wireless two-way speech communication in noisy environments is a known problem. Especially, speech intelligibility can be severely decreased if the listener at the near-end of the two-way communication is located in environments where the acoustic noise level is high. The problem is known from mobile phone communication when one or both persons involved in the communication are located outside in traffic noise or the like. Specifically, speech intelligibility is important for communication between persons involved in a critical or even life-threatening situation, such as communication between rescue personnel, fire fighters etc. where audibility of a spoken message may be critical.

Introduction of a speech enhancement processing in the communication link is a known measure to improve speech intelligibility in the presence of noise at the near-end. To provide a processing for enhancing speech enhancement at the near-end, a number of approached have been suggested.

One example of a speech enhancement algorithm can be found in M. Niermann and P. Vary, "*Listening Enhancement in Noisy Environments: Solutions in Time and Frequency Domain*", IEEE/ACM Transactions on Audio, Speech, and Language Processing, vol. 29, pp. 699-709, 2021.

However, existing speech enhancement algorithms may be capable of enhancing speech intelligibility, but at the price of introducing audible artifacts and thus a degradation of perceived audio quality.

SUMMARY OF THE INVENTION

Thus, according to the above description, it is an object of the present invention to provide a speech enhancement algorithm with a minimal degradation of audio quality.

In a first aspect, the invention provides a computer implemented method for enhancement of speech intelligibility in a communication device arranged for a near-end side of a communication with a far-end device, the method comprises calculating a measure of speech intelligibility at the near-end side in response to a near-end audio input and a far-end audio input from the far-end device, such as a near-end audio input based on a microphone placed at the near-end side, optimizing parameters of a predetermined speech enhancement algorithm in response to: 1) the calculated measure of speech intelligibility, 2) a predetermined speech intelligibility target, and 3) at least one additional target, such as an audio quality target, to generate an optimized speech enhancement algorithm, processing the far-end audio input according to the optimized speech enhancement algorithm, and generating a near-end audio output in response to an output from the optimized speech enhancement algorithm.

Such method is advantageous for use in e.g. 2-way wireless communication devices where the near-end device is expected to be used in noisy environments. The speech enhancement algorithm can be implemented in the near-end device in the signal path between the received audio input from the far-end device and the near-end audio output, i.e. as a pre-emphasis signal processing for enhancing speech intelligibility.

The method is especially advantageous, since it allows the speech enhancement algorithm to adapt to changing noise conditions at the near-end side, so as to enhance speech intelligibility when required to meet the predetermined speech intelligibility, e.g. a specified Speech Intelligibility Index value, such as an Approximated Speech Intelligibility Index (ASII), and at the same time take into account one or more other targets when optimizing the parameters of the speech enhancement algorithm. Especially, such other target can be audio quality, i.e. minimizing audible artifacts, while at the same time enhancing speech intelligibility to a specified level.

With a continuously monitoring of actual speech intelligibility, e.g. in the form of a signal-to-noise ratio estimation, it can be ensured that only the minimal speech enhancement processing is performed to obtain the specified speech intelligibility also under varying noise conditions. E.g., in case of high environmental noise levels, the parameters of the speech enhancement algorithm are optimized to provide a high speech enhancement effect. In case of silent environmental conditions the speech intelligibility satisfy the requirements even without any help from the speech enhancement algorithm, and thus the speech enhancement algorithm may be eliminated or by-passed which leads to minimal audible artifacts and lowest possible processing delay time and electric power consumption.

The algorithm for optimizing parameters of the speech enhancement algorithm taking into account one or more additional parameters apart from speech intelligibility has been found to be possible to implement with a closed-form optimizing algorithm which allows a processing effective implementation. This allows implementation in low cost and low power mobile communication devices, such as wireless 2-way communication devices.

In the following, non-limiting preferred features and embodiments will be described.

It is to be understood that an audio quality target can in practice be implemented in may ways. Especially, audio distortion or audible artefacts, understood as a distortion or an addition of audible artefacts to the input signal, can serve as a measure of audio quality, and thus a distortion target or audible artefact target can be used as an audio quality target.

The method preferably comprises optimizing the speech intelligibility algorithm in response to a predetermined trade-off between the predetermined speech intelligibility target and the at least one additional target. Especially, the additional target may be audio quality or a measure of audible artifacts. The trade-off may be taken into account in the formulation of a cost function or another mathematical formulation which can be solved according to a computer algorithm. Especially, it may be possible to weight which of the targets to weight as the most important one in case none of the targets can be fulfilled. Especially, an optimization criterion may be formulated which takes into account the speech intelligibility target and the additional target in an optimization algorithm. Most preferably, the optimization algorithm is formulated a closed-form formulation.

Especially, the method may comprise comparing the calculated measure of speech intelligibility with the predetermined speech intelligibility target. In some embodiments, the method comprises: in case the calculated measure of speech intelligibility meets the predetermined speech intelligibility target, generating the near-end audio output directly in response to the far-end audio input, such as by-passing the speech enhancement algorithm, such as the optimized speech enhancement algorithm being a non-processing algorithm. In some embodiments, the method comprises: in case the calculated measure of speech intelligibility does not meet the predetermined speech intelligibility target, optimizing parameters of the speech enhancement algorithm so as to provide a minimal speech intelligibility enhancement processing for meeting the predetermined speech intelligibility target.

The method may comprise optimizing parameters of the speech enhancement algorithm based on calculating an estimated speech intelligibility index and calculating a penalty measure, such as the estimated speech intelligibility index by calculating an approximated speech intelligibility index. Especially, the penalty measure may be calculated as a measure of error between a speech signal after processing by the optimized speech enhancement algorithm and a speech signal in the far-end audio input. Specifically, this may involve calculating a mean-square error between speech after processing by the optimized speech enhancement algorithm and speech in the far-end audio input.

The method may comprise performing said steps of calculating the measure of speech intelligibility and the step of optimizing parameters of the speech enhancement algorithm based on spectral sub band representations of the near-end audio input and of the audio input from the far-end device. Especially, the representation may be based on Short Time discrete Fourier Transform representations of the near-end audio input and of the audio input from the far-end device. Specifically, the spectral sub band representation may involve frequency bands based on critical bands. Here, the term 'critical band' is well known within the field of psychoacoustics, and is related to the frequency band characteristics of the human hearing.

The method may comprise that the step of optimizing parameters of the speech enhancement algorithm involves applying a gain rule on a frequency representation of the far-end audio input and a representation of near-end noise. Specifically, this may involve applying said gain rule on spectral sub band representations of the far-end audio input and the representation of near-end noise. Especially, the representation of near-end noise may be based on the near-end audio input, such as the near-end noise being identical to the near-end audio input, e.g. an output from a near-end microphone.

The communication device may comprise a wireless receiver arranged to receive the far-end audio input from the far-end device represented in a wireless signal.

The communication device may comprise a wireless transmitter arranged to transmit the near-end audio input in a wireless signal to the far-end device.

The near-end audio input is preferably based on an output from a microphone at the near-end side, such as a microphone forming part of the communication device.

The at least one additional target preferably comprises one or more of:

1) a high audio quality of the audio output,
2) a low power consumption of the communication device for processing the far-end audio input according to the optimized speech enhancement algorithm,
3) a low processing power required by a processor in the communication device for processing the far-end audio input according to the optimized speech enhancement algorithm, and
4) a low delay time for processing the far-end audio input according to the optimized speech enhancement algorithm.

Especially, the additional target may comprise at least two of the above 1)-4) targets.

The step of optimizing the parameters of the speech enhancement algorithm in response to the calculated measure of speech intelligibility and at least one additional target preferably involves calculating a closed-form optimizing algorithm. This allows an efficient optimizing processing which is suited for a implementation on a digital processor. Thus, the parameters may be optimized and adapted continuously or at least frequently to allow for quickly adaptation to varying noise conditions at the near-end. This may be possible even on low cost and low power mobile communication devices with limited processing capacity and/or limited battery capacity.

The step of optimizing the parameters of the speech enhancement algorithm may take into account optimizing the parameters of the speech enhancement algorithm in an adaptive manner in response to the near-end audio input and the far-end audio input. Especially, this may involve minimizing processing in the speech enhancement algorithm to just meet the predetermined speech intelligibility target. Specifically, optimizing the parameters of the speech enhancement algorithm may be performed adaptively.

The step of optimizing the parameters of the speech enhancement algorithm, and thus updating the speech enhancement algorithm, may be performed during normal operation of the near-end device. Especially, the optimizing is performed at least once every 10 seconds, such as at least once every 2 seconds, or at least once every second. Hereby, the speech enhancement algorithm can adapt to varying noise conditions at the near-end.

Especially, the speech intelligibility target may be represented by an Approximated Speech Intelligibility Index measure (ASII) and/or a target based on an Extended Short-Time Objective Intelligibility (ESTOI) measure.

The method may comprise receiving a representation of the speech intelligibility target, such as from a user via a user interface. Alternatively, the speech intelligibility target may be a prestored value or other representation.

The method may comprise receiving a representation of the at least one additional target, such as from a user via a user interface. Alternatively, the at least one additional target may be one or more prestored value(s) or other representation(s). Especially, the at least one additional target may be represented by a numerical value indicating a measure of the additional target.

In general, the method is understood to be programmable on a computer system, and compared to prior art methods, the computations to be performed are less complex.

In a second aspect, the invention provides a computer program code arranged to cause, when executed on a device with a processor, to perform the method according to the first aspect.

Especially, the program code may be suited for execution on a general computer, e.g. a PC, or tablet or the like, or it may be arranged to be performed on a dedicated signal processor or the like, e.g. a signal processor in a mobile device, e.g. in a wireless two-way communication device. However, the program code may be designed to be executed on one device and capable of providing the speech intelligibility enhancement algorithm output in a format to be stored into or downloaded into a wireless two-way communication device.

In a third aspect, the invention provides a communication device configured to perform the method according to the first aspect.

Especially, the communication device may comprise

- a microphone arranged to generate the near-end audio input,
- a receiver for receiving the far-end audio input from a far-end device, such as a wireless receiver,
- a processor programmed to perform the method according to the first aspect, and
- a loudspeaker arranged to generate an acoustic output in response to the near-end audio output.

In some embodiments, the communication device is one of: a headset, an intercom device, a handset, a public address device, and a table-top communication device. By a public address device is understood a device capable of receiving an audio input, e.g. in wireless or wired for, and generating an acoustic output accordingly, preferably by means of one or more loudspeakers.

In preferred embodiments, the communication device comprises a wireless receiver arranged to receive the far-end audio input represented in a wireless signal. The wireless receiver may be configured to operate according to an RF transmission protocol, especially an RF transmission protocol selected from the group of: Digital Enhanced Cordless Telecommunication, Bluetooth, Bluetooth Low Energy or Bluetooth Smart, Cellular 4G or 5G, and a proprietary RF protocol.

The communication device may comprise a wireless transmitter for transmitting the near-end audio input represented in a wireless signal. Especially, the wireless transmitter may be configured to operate according to an RF transmission protocol, e.g. an RF transmission protocol selected from the group of: Digital Enhanced Cordless Telecommunication, Bluetooth, Bluetooth Low Energy or Bluetooth Smart, Cellular 4G or 5G, and a proprietary RF protocol.

The communication device may be arranged for wireless two-way audio communication with a far-end device.

In a special embodiment, the communication device comprises a two-way intercom device built into a helmet arranged to be worn by a person, such as the two-way intercom device being partly or fully built into a firefighter helmet.

In some embodiments, a first part of the speech enhancement algorithm is implemented on the far-end device, while a second part of the speech intelligibility enhancement algorithm is implemented on the near-end device.

In some embodiments, the entire speech enhancement algorithm as well as the optimizing algorithm serving to optimize the parameters of the speech enhancement algorithm is implemented entirely on the near-end device.

In a Public Address device or system, the near-end device may only be arranged to receive enhanced audio and not necessarily be arranged for two-way communication. However, in other systems the wireless audio device may be a wireless two-way speech communication device.

In a fourth aspect, the invention provides a wireless communication system comprising

- a first wireless communication device according to the third aspect to operate as a near-end communication device and being configured to receive a wireless far-end audio input, and
- at least a second wireless communication device arranged to operate as a far-end communication device and being configured for transmitting the wireless far-end audio input to the first wireless communication device.

Especially, both of the first and second wireless communication devices may be arranged for two-way speech communication.

In a fifth aspect, the invention provides use of the communication device according to the third aspect for two-way speech communication.

In a sixth aspect, the invention provides use of the communication system according to the fourth aspect for two-way speech communication.

It is appreciated that the same advantages and embodiments described for the first aspect apply as well the further mentioned aspects. Further, it is appreciated that the described embodiments can be intermixed in any way between all the mentioned aspects.

BRIEF DESCRIPTION OF THE FIGURES

The invention will now be described in more detail with regard to the accompanying figures of which

The figures illustrate specific ways of implementing the present invention and are not to be construed as being limiting to other possible embodiments falling within the scope of the attached claim set.

DETAILED DESCRIPTION OF THE INVENTION

Figure 1:
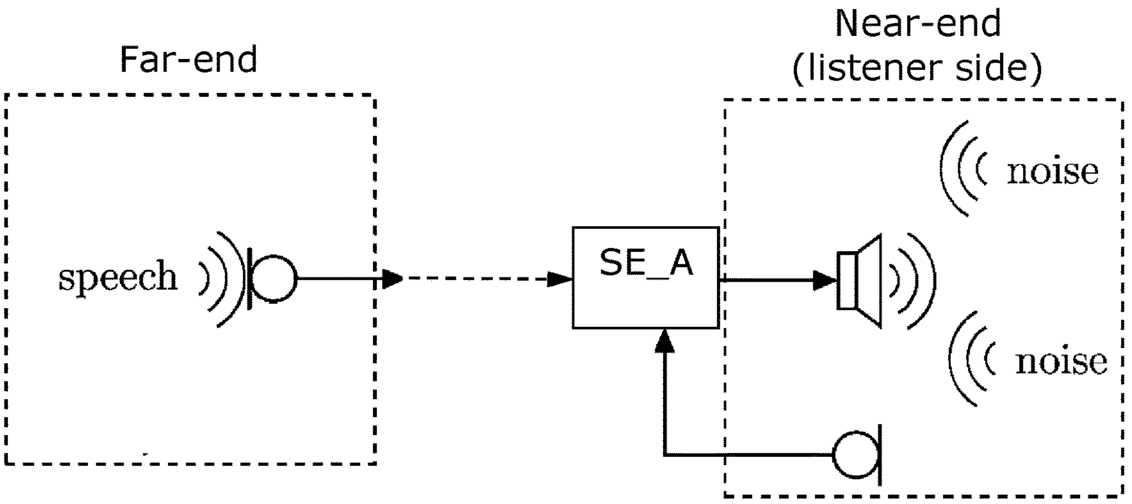
FIG. 1 illustrates a two-way communication scenario with noise at the near-end and with speech enhancement method implemented according to the invention.

FIG. 1 shows an example of an overall scenario of a wireless two-way communication devices, a far-end device and a near-end device, where the far-end device has a microphone capturing speech from a far-end person, and transmitting a speech signal accordingly in a wireless representation. At the near-end side, the near-end device receives the speech signal and applies a speech enhancement algorithm SE_A with the purpose of enhancing speech intelligibility at the near-end side after converting the enhanced speech signal via an electroacoustic transducer, e.g. comprising a loudspeaker or headphone to produce an audible speech signal to a person at the near-end (listener side).

The speech enhancement algorithm SE_A according to the invention is based on a predetermined speech enhancement algorithm which is adaptively optimized with respect to one or more parameters, so as to adaptively change the speech enhancement processing in response to a measure of speech intelligibility at the near-end side. This is illustrated in FIG. 1 by an input to the speech enhancement algorithm SE_A from a near-end microphone. Based on the input from this microphone and the far-end speech signal, an optimizing algorithm serves to optimize the speech enhancement algorithm SE_A to meet a predetermined speech intelligibility target and at the same time to optimize at least one additional target, e.g. audio quality for example expressed as target based on maximum tolerable audible artifacts or audible signal degradation.

The speech enhancement method according to the invention is advantageous since it allows the speech enhancement algorithm SE_A to adapt its function to the actual noise conditions at the near-end. Thus, if there is a high noise level, the optimizing algorithm will optimize parameters of the speech enhancement algorithm SE_A such that it seeks to fulfil the speech intelligibility target, and this may in some cases cause a degradation of audio quality which may be acceptable to obtain a reasonable speech intelligibility. On the contrary, if the noise level at the near-end is low, then the optimizing algorithm can seek to fulfil the additional target, e.g. audio quality, by minimizing the speech enhancement processing SE_A and even eliminating it, if the speech intelligibility target can be met without any speech enhancement. Hereby, audio quality can be optimized instead.

Compared to a fixed speech enhancement algorithm, the proposed adaptive speech enhancement algorithm SE_A allows a flexible speech enhancement which can adapt to various noise conditions at the near-end without suffering from poor speech intelligibility at high noise levels, and poor audio quality at low noise levels which is typically the result with a standard speech enhancement algorithm with fixed parameters since these are usually set as a fixed compromise between speech enhancement and audio quality.

Figure 2:
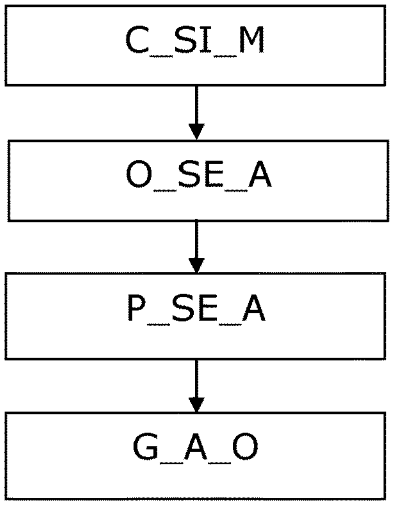
FIG. 2 shows steps of a method embodiment.

FIG. 2 shows steps of an embodiment of the method, namely a method for providing a speech enhancement processing algorithm by means of a computer or other suitable processor, e.g. a processor in a communication device. The method comprises calculating C_SI_M a measure of speech intelligibility at the near-end side in response to a near-end audio input and a far-end audio input from the far-end device. Preferably, this comprises receiving an output from a microphone placed at the near-end side as the near-end audio input, and receiving a wireless Radio Frequency signal with the far-end audio input represented therein. The measure of speech intelligibility may be expressed as a single value, e.g. a speech intelligibility index based value.

Next, optimizing O_SE_A parameters of a predetermined speech enhancement algorithm in response to: 1) the calculated measure of speech intelligibility, M_SI, 2) a predetermined speech intelligibility target, T_SI, and 3) at least one additional target, M_D, such as an audio distortion target (or audio quality target), to generate an optimized speech enhancement algorithm. The targets 2) and 3) may be preset by a user, or one or both may be adjustable by a user so as to allow the user to influence the trade-off between the targets in the optimizing algorithm and thereby influence the practical function of the speech enhancement algorithm, e.g. to prioritize speech intelligibility versus audible quality or vice versa. The O_SE_A is summarized with an optimization problem:

$$\min M\_D(SP\_S, Y\_S, N\_S), \text{ subject to } M\_SI(SP\_S, Y\_S, N\_S) \geq T\_SI$$

Here, SP_S is the spectrum of the input speech signal to the speech enhancement algorithm SE_A, Y_S is the spectrum of output signal of the speech enhancement algorithm, and N_S a near-end noise spectrum.

Next, the processing P_SE_A the far-end audio input according to the optimized speech enhancement algorithm, and finally generating G_A_O a near-end audio output in response to an output from the optimized speech enhancement algorithm.

Figure 3:
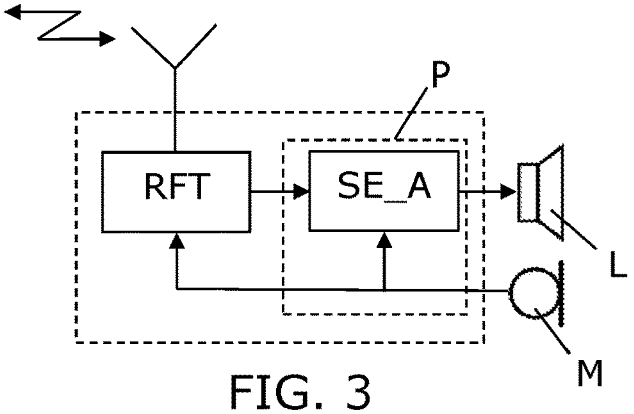
FIG. 3 illustrates a device embodiment.

FIG. 3 shows a block diagram of a device embodiment in the form of a wireless communication device embodiment, e.g. an intercom device or a Public Address device, or a wireless two-way communication device, such as a mobile wireless two-way communication device.

The device has a microphone M arranged to generate a near-end audio input, and a wireless transceiver RFT, including an RF receiver for receiving the far-end audio input from the far-end device in a wireless representation, and for RF transmitting the near-end audio input from the microphone M in a wireless representation to the far-end device.

Further, the device has a processor P which executes a program code implementing the method as explained above, involving implementing an adaptive speech enhancement algorithm SE_A which is optimizing with respect to a speech intelligibility target and an additional target. The speech enhancement algorithm SE_A with its parameters optimized according to an optimizing algorithm and generates a near-end audio output in response to the received far-end audio input. Finally, the device comprises a loudspeaker L or other electroacoustic transducer arranged to generate an acoustic output in response to the near-end audio output.

Figure 4:
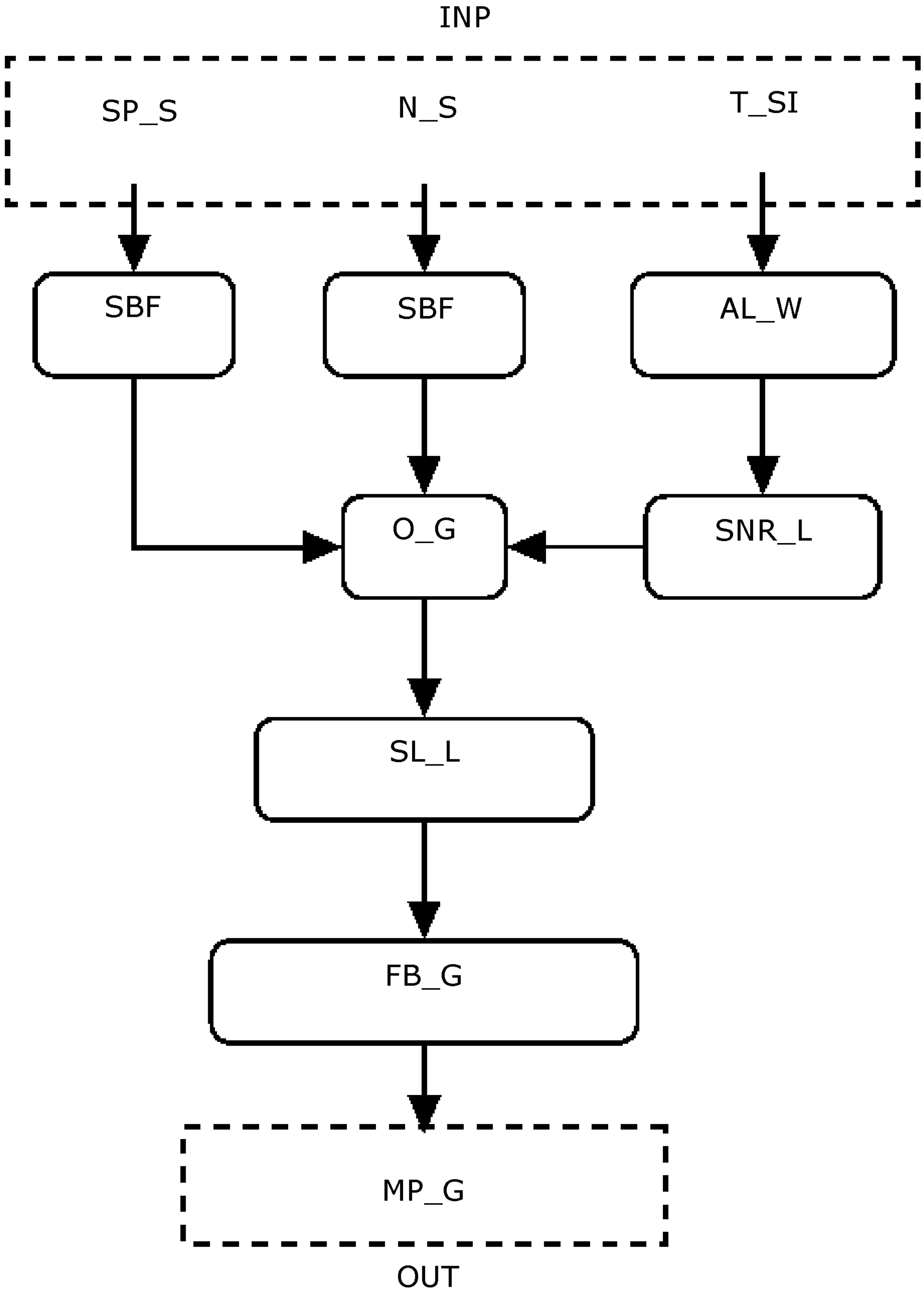
FIG. 4 illustrates a flow chart showing more details of a method embodiment.

FIG. 4 illustrates a flowchart of a preferred gain rule based speech enhancement algorithm optimization which operates on sub band representations.

The inputs INP are: a speech spectrum SP_S, a noise spectrum N_S, and a target speech intelligibility T_SI, e.g. in the form of an approximated speech intelligibility index (ASII).

The speech enhancement algorithm provides the optimal gains to the O_SE_A optimization problem where the speech distortion measure M_D is a mean squared error and the speech intelligibility measure M_SI is the ASII:

$$\min MSE(SP\_S, Y\_S), \text{subject to } \mathrm{ASII}(SP\_S, Y\_S, N\_S) \geq T\_SI$$

The speech spectrum SP_S is applied to a sub band filtering SBF which averages energy per sub band over several short-time frames (i.e. seconds) providing the subband speech spectrum SB_S. The noise spectrum N_S is also applied to a sub band filtering SBF which also averages energy per sub band over several short-time frames (i.e. seconds) providing the subband noise SB_N. The target speech intelligibility T_SI in the form of ASII is applied to a weighted audibility limit processing AL_W which determines sub band audibility limits which serve to cause a minimum total ASII performance. These sub band audibility limits are then converted SNR_L to target signal-to-noise limits in sub bands, T_SNR_L.

The sub band outputs from the two SBFs, and the signal-to-noise limit sub bands SNR_L are applied to an optimal gains optimizing algorithm O_G which can be expressed in a closed-form algorithm.

The gains optimizing algorithm O_G determines the optimized subband power gain, SB_G, according to the following algorithm:

1. If $$\frac{SB\_S}{SB\_N} \geq T\_SNR\_L,$$

then SB_G=1. That is, no gain is applied if the subband speech intelligibility target meets the predetermined target and minimizes distortions and the mean squared error.

2. If $$\frac{SB\_S}{SB\_N} < T\_SNR\_L, \text{ then } SB\_G = \frac{SB\_S \cdot T\_SNR\_L}{SB\_N}.$$

That is, the gains provide a minimal speech intelligibility enhancement processing for meeting the predetermined speech intelligibility target.

The output gains are limited in a sound level limiter SL_L, and then the resulting gains per frequency bins are determined in step FB_G. Finally, the optimized parameters expressed as the sub band gains are applied to processing MP_G which processes the gains to produce an output OUT.

In the implementation of the invention shown in FIG. 4, an additional target apart from the target speech intelligibility T_SI is taken into account in the calculation of optimal gains O_G. The closed-form optimal gains calculation O_G takes this additional target into account, e.g. this can be done in the form of a mean squared error between the processed speech and the far-end audio input (i.e. unprocessed audio input) if the additional target is audio quality (audible artefacts or a distortion measure).

So, the additional target is not necessarily an input parameter in the form of a numerical value of a measure of the target which should be obtained, however if could be such as numerical value of a measure of the target. Rather, the additional target can be implemented as a goal taken into account in the optimization and thus in the way the optimal gains calculation O_G is performed. In other words, the cost function for the optimization O_G which is seeked to be minimized (speech distortion) or maximized (audio quality) at the same time as the speech intelligibility target T_SI should be met.

For further mathematical details, reference is made to the now published paper by the inventor: "*Minimum Processing Near-End Listening Enhancement*", IEEE/ACM Transactions on Audio, Speech, and Language Processing, Vol. 31, pp. 2233-2245, 2023.

To sum up, the invention provides a method for enhancement of speech intelligibility in a communication device arranged for a near-end side of a communication with a far-end device, e.g. a communication device for 2-way communication use in noisy environments. The method involves calculating C_SI_M a measure of speech intelligibility at the near-end side based on a near-end audio input and a far-end audio input. Then, based on the calculated measure of speech intelligibility optimizing O_SE_A parameters of a predetermined speech enhancement algorithm, where a predetermined speech intelligibility target, and an additional target are taken into account to generate an optimized speech enhancement algorithm. Next, processing P_SE_A the far-end audio input according to the optimized speech enhancement algorithm, and generating G_A_O a near-end audio output accordingly. In this way, the speech enhancement algorithm can adapt to changing noise conditions and always be optimized for both speech intelligibility and another target, e.g. audio quality. Especially, the optimization can seek to just satisfy the predetermined speech intelligibility target, and then optimize the other target. This can be used e.g. to minimize delay, electric power consumption and audio quality while satisfying the speech intelligibility target. An effective implementation of the optimization can be based on a closed-form solution.

Although the present invention has been described in connection with the specified embodiments, it should not be construed as being in any way limited to the presented examples. The scope of the present invention is to be interpreted in the light of the accompanying claim set. In the context of the claims, the terms "including" or "includes" do not exclude other possible elements or steps. Also, the mentioning of references such as "a" or "an" etc. should not be construed as excluding a plurality. The use of reference signs in the claims with respect to elements indicated in the figures shall also not be construed as limiting the scope of the invention. Furthermore, individual features mentioned in different claims, may possibly be advantageously combined, and the mentioning of these features in different claims does not exclude that a combination of features is not possible and advantageous.

The invention claimed is:

1. A computer implemented method for enhancement of speech intelligibility in a communication device arranged for a near-end side of a communication with a far-end device, comprising:

calculating a calculated measure of speech intelligibility at the near-end side in response to a near-end audio input and a far-end audio input from the far-end device, comparing the calculated measure of speech intelligibility with a predetermined speech intelligibility target, and, in case the calculated measure of speech intelligibility meets the predetermined speech intelligibility target, generating a near-end audio output directly in response to the far-end audio input, optimizing parameters of a predetermined speech enhancement algorithm in response to: 1) the calculated measure of speech intelligibility, 2) the predetermined speech intelligibility target, and 3) at least one additional target to generate an optimized speech enhancement algorithm, processing the far-end audio input according to the optimized speech enhancement algorithm, and generating a near-end audio output in response to an output from the optimized speech enhancement algorithm.

2. The method according to claim 1, comprising optimizing the predetermined speech enhancement algorithm in response to a predetermined trade-off between the predetermined speech intelligibility target and the at least one additional target.

3. The method according to claim 1, in case the calculated measure of speech intelligibility does not meet the predetermined speech intelligibility target, optimizing parameters of the predetermined speech enhancement algorithm so as to provide a minimal speech intelligibility enhancement processing for meeting the predetermined speech intelligibility target.

4. The method according to claim 1, comprising the calculating the measure of speech intelligibility and the optimizing parameters of the speech enhancement algorithm based on spectral sub band representations of the near-end audio input and of the audio input from the far-end device.

5. The method according to claim 1, wherein the step of optimizing parameters of the speech enhancement algorithm involves applying a gain rule on a frequency representation of the far-end audio input and a representation of near-end noise.

6. The method according to claim 1, wherein the near-end audio input is based on an output from a microphone at the near-end side.

7. The method according to claim 1, wherein the at least one additional target comprises one or more of:

1) A high audio quality of the audio output,

2) A low power consumption of the communication device for processing the far-end audio input according to the optimized speech enhancement algorithm, 3) a low processing power required by a processor in the communication device for processing the far-end audio input according to the optimized speech enhancement algorithm, and 4) a low delay time for processing the far-end audio input according to the optimized speech enhancement algorithm.

8. The method according to claim 7, wherein the additional target comprises at least two of (1)-(4).

9. The method according to claim 1, wherein the step of optimizing the parameters of the speech enhancement algorithm in response to the calculated measure of speech intelligibility and at least one additional target involves calculating a closed-form optimizing algorithm.

10. The method according to claim 1, wherein the step of optimizing the parameters of the speech enhancement algorithm takes into account optimizing the parameters of the speech enhancement algorithm in an adaptive manner in response to the near-end audio input and the far-end audio input.

11. A communication device, comprising:

a microphone arranged to generate the near-end audio input, a receiver for receiving the far-end audio input from a far-end device, a processor programmed to perform the method according to claim 1, and a loudspeaker arranged to generate an acoustic output in response to the near-end audio output.

12. The communication device according to claim 11, being one of: a headset, an intercom device, a handset, a public address device, and a table-top communication device.

13. A computer implemented method for enhancement of speech intelligibility in a communication device arranged for a near-end side of a communication with a far-end device, comprising:

calculating a calculated measure of speech intelligibility at the near-end side in response to a near-end audio input and a far-end audio input from the far-end device, optimizing parameters of a predetermined speech enhancement algorithm in response to: 1) the calculated measure of speech intelligibility, 2) a predetermined speech intelligibility target, and 3) at least one additional target to generate an optimized speech enhancement algorithm, optimizing parameters of the optimized speech enhancement algorithm based on calculating an estimated speech intelligibility index and calculating a penalty measure, wherein the penalty measure is calculated as a measure of error between a speech signal after processing by the optimized speech enhancement algorithm and a speech signal in the far-end audio input processing the far-end audio input according to the optimized speech enhancement algorithm, and generating a near-end audio output in response to an output from the optimized speech enhancement algorithm.

* * * * *